Figure 2:
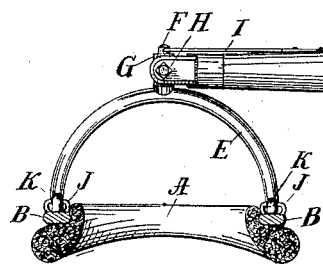

(No Model.)

G. H. GILDERSLEEVE.
HARNESS.

No. 435,059. Patented Aug. 26, 1890.

Witnesses

Inventor
George H. Gildersleeve
By his Attorneys
Moulton & Rogers

UNITED STATES PATENT OFFICE.

GEORGE H. GILDERSLEEVE, OF GRAND RAPIDS, MICHIGAN.

HARNESS.

SPECIFICATION forming part of Letters Patent No. 435,059, dated August 26, 1890.

Application filed January 10, 1889. Serial No. 296,024. (No model.)

*To all whom it may concern:*

Be it known that I, GEORGE H. GILDERSLEEVE, a citizen of the United States, residing at Grand Rapids, in the county of Kent and State of Michigan, have invented certain new and useful Improvements in Horse-Yokes; and I do hereby declare the following to be a full, clear, and exact description of the invention, such as will enable others skilled in the art to which it appertains to make and use the same, reference being had to the accompanying drawings.

My invention relates to improvements in devices for attaching neck-yokes to hames, whereby the strain of pulling by a pair of horses shall fall upon said neck-yoke instead of upon the evener, thus dispensing with the use of much of the common harness, especially with tugs and whiffletrees, and enabling the team to be driven much closer to objects than can be done when the ordinary harness and whiffletrees are used. This I accomplish by the device illustrated in the drawings, wherein—

Figure 1:
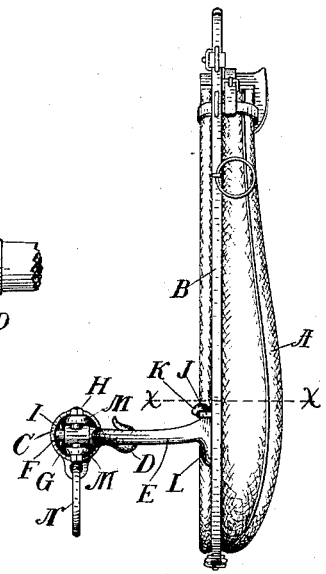
Figure 3:
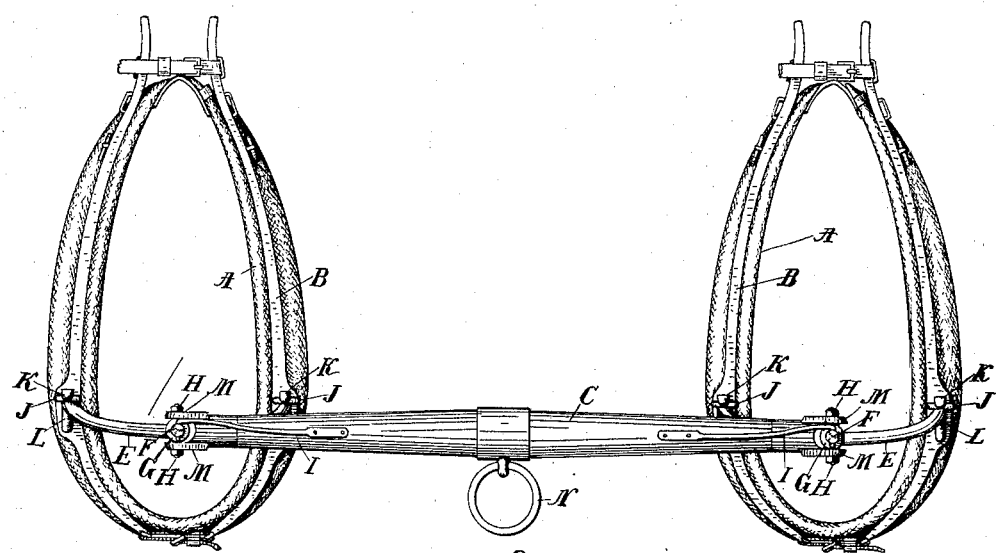

Figure 1 is a side elevation of a device embodying my invention. Fig. 2 is a sectional plan on the line $x$ of Fig. 1. Fig. 3 is a front elevation.

Similar letters refer to corresponding parts throughout the several figures.

A represents an ordinary horse-collar; B B, hames; and C, neck-yoke.

D is a hook attached to the inside of neck-yoke for attaching to tongue of vehicle.

E is a yoke detachably secured to hames B by hooks K K and eyes J J.

F is a pin projecting outward from center of yoke E.

G is a sleeve in which the pin F plays.

H H are pivots upon opposite sides of sleeve G.

I is a spring-latch to hold pin in sleeve.

J J are eyes rigidly secured to hames, into which take the hooks K K, curving upward from top of yoke, of which they are integral. L L are also integral and project downward from the under side of yoke E, forming a shoulder against face of hame for keeping yoke E horizontal, as shown in Fig. 1.

M M are jaws of neck-yoke C, embracing the sleeve and having holes through which pass pivots H H of sleeve G.

N is a ring suspended from center of neck-yoke.

The use, operation, and advantages of this device are as follows: First, to attach the yoke E to the hame B engage the hooks K K with the eyes J J by raising the yoke E vertically a sufficient degree to admit of such engagement. The arms L L then rest upon hames B B, forming a shoulder. The pin F, passing through the sleeve G, pivoted in the jaws M M, supports the neck-yoke, which may be attached to the tongue of a vehicle by the hook D or any other suitable device. This device for attaching horses to vehicles dispenses with a large portion of the ordinary harness, thus securing greater speed in hitching up; also, with tugs and whiffletrees and for plowing among trees or stumps this device is specially adapted; also, for driving among other vehicles where whiffletrees projecting from each side of the team are apt to catch upon passing vehicles. Being adjustable, it easily adapts itself to inequalities of surface traveled over by the team, where one horse may be traveling upon a greater elevation than another or where one is in advance of the other.

Having thus described my invention, what I claim as new, and desire to secure by Letters Patent, is—

1. In combination with ordinary hames provided with eyes J, two semicircular yokes E, having at each end upwardly and forwardly curved hooks K for engaging said eyes, and oppositely-placed downwardly-projecting arms or studs L for engaging the front of the hames and limiting the downward inclination of said yokes, and neck-yoke C, removably pivoted to said yokes, substantially as and for the purposes specified.

2. The combination of a neck-yoke having a hook D, jaws M, and spring-latch I, sleeve G, pivoted between said jaws, hames B, having eyes J, and a yoke E, having hooks K, arms L, and pin F, engaging with said sleeve G, secured by latch I, substantially as described.

In testimony whereof I affix my signature in presence of two witnesses.

GEORGE H. GILDERSLEEVE.

Witnesses:
LUTHER V. MOULTON,
DENNIS L. ROGERS.